(12) United States Patent
Mieyan et al.

(10) Patent No.: US 11,338,631 B2
(45) Date of Patent: May 24, 2022

(54) INFLATION VALVE FOR TIRE RIM WITH LIMITATION OF ELASTIC DEFORMATION

(71) Applicants: Continental Automotive France, Toulouse (FR); Continental Automotive GmbH, Hannover (DE)

(72) Inventors: Jérémy Mieyan, Saiguede (FR); Gilles Capdepon, Vernet (FR); Pascal Petitjean, Saint Thomas (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 16/756,004

(22) PCT Filed: Oct. 16, 2018

(86) PCT No.: PCT/FR2018/052564
§ 371 (c)(1),
(2) Date: Apr. 14, 2020

(87) PCT Pub. No.: WO2019/077255
PCT Pub. Date: Apr. 25, 2019

(65) Prior Publication Data
US 2020/0298636 A1  Sep. 24, 2020

(30) Foreign Application Priority Data
Oct. 16, 2017 (FR) .................................... 1759644

(51) Int. Cl.
*B60C 29/00* (2006.01)
*B60C 23/04* (2006.01)
(Continued)

(52) U.S. Cl.
CPC ........ *B60C 29/005* (2013.01); *B60C 23/0494* (2013.01); *B60C 29/02* (2013.01);
(Continued)

(58) Field of Classification Search
CPC ... B60C 29/02; B60C 29/005; B60C 23/0494; G01L 7/00; Y10T 137/36;
(Continued)

(56) References Cited

U.S. PATENT DOCUMENTS 4,475,578 A * 10/1984 Nidle ...................... B60C 29/02
137/234.5
6,005,480 A * 12/1999 Banzhof ............. B60C 23/0494
340/442
(Continued)

FOREIGN PATENT DOCUMENTS

DE   202014102927 U1   7/2014
EP        2857230 A1 *  4/2015  ......... B60C 23/0494
(Continued)

OTHER PUBLICATIONS

International Search Report and Written Opinion for International Application No. PCT/FR2018/052564, dated Jan. 30, 2019, 8 pages. 2020.
(Continued)

*Primary Examiner* — Craig J Price
(74) *Attorney, Agent, or Firm* — RatnerPrestia (57) ABSTRACT

A valve with elastic deformation and having a tubular core adapted to form an internal air passage from an external longitudinal end of the valve to an internal longitudinal end, the tubular core being at least partially surrounded by a sleeve of elastically deformable material and having a bulb shape widening in proximity to the internal longitudinal end of the valve and ending in an internal longitudinal bulb end. A cup made of rigid material includes a first portion facing
(Continued)

an internal longitudinal bulb end face and at least one second portion curved away from the internal longitudinal end of the valve, the cup serving as a way of limiting deformation of the bulb.

9 Claims, 3 Drawing Sheets (51) Int. Cl.
*B60C 29/02* (2006.01)
*G01L 17/00* (2006.01)
*F16K 15/20* (2006.01)

(52) U.S. Cl.
CPC ............. *F16K 15/20* (2013.01); *G01L 17/00* (2013.01); *Y10T 137/3584* (2015.04)

(58) Field of Classification Search
CPC ......... Y10T 137/3662; Y10T 137/3646; Y10T 137/3584; F16K 15/20
USPC ..... 137/224, 226, 227; 152/415, 429, 152.1, 152/151, 516; 73/146–146.8; 340/442–447
See application file for complete search history.

(56) References Cited

U.S. PATENT DOCUMENTS

| | | | | |
|---|---|---|---|---|
| 6,163,255 A * | 12/2000 | Banzhof | ............ | B60C 23/0408 340/442 |
| 6,647,772 B2 * | 11/2003 | Ito | ...................... | B60C 23/0494 73/146 |
| 6,774,775 B2 * | 8/2004 | Ito | ...................... | B60C 23/0408 340/442 |
| 6,851,308 B2 * | 2/2005 | Fonteneau | .......... | B60C 23/0494 73/146 |
| 6,895,810 B2 * | 5/2005 | Saheki | ................ | B60C 23/0408 73/146 |
| 6,945,104 B2 * | 9/2005 | Uleski | ................. | B60C 23/0408 340/443 |
| 7,107,830 B1 * | 9/2006 | Yu | ...................... | B60C 23/0408 73/146 |
| 7,281,421 B2 * | 10/2007 | Yin | ..................... | B60C 23/0408 73/146.5 |
| 7,284,418 B2 * | 10/2007 | Yin | ..................... | B60C 23/0494 340/438 |
| 7,454,965 B2 * | 11/2008 | Blossfeld | ............ | B60C 23/0408 73/146 |
| 7,568,386 B2 * | 8/2009 | Blossfeld | ............ | B60C 23/0408 73/146.8 |
| 7,587,935 B2 * | 9/2009 | Kempf | ................ | B60C 23/0408 73/146 |
| 7,669,466 B2 * | 3/2010 | Ray | ..................... | B60C 23/0494 73/146.8 |
| 8,286,474 B2 * | 10/2012 | Kempf | ................ | B60C 23/0408 73/146.8 |
| 8,474,475 B2 * | 7/2013 | Palaoro | ............... | B60C 23/0494 137/227 |
| 8,516,882 B2 * | 8/2013 | Rigney | ............... | B60C 23/0494 73/146.8 |
| 8,839,667 B2 * | 9/2014 | Kempf | ................ | B60C 23/0408 73/146.8 |
| 9,315,079 B2 * | 4/2016 | Huang | ................ | B60C 23/0498 |
| 9,630,460 B2 * | 4/2017 | Hettle | ................ | B60C 23/0494 |
| 9,669,668 B2 * | 6/2017 | Kempf | ................ | B60C 23/0494 |
| 9,669,669 B2 * | 6/2017 | Gorenzweig | ....... | B60C 23/0494 |
| 10,316,978 B2 * | 6/2019 | Mori | ..................... | F16K 37/005 |
| 10,828,945 B2 * | 11/2020 | Li | ........................... | B60C 23/04 |
| 2006/0272758 A1 * | 12/2006 | Yin | .................... | B60C 23/0452 152/427 |
| 2006/0288924 A1 * | 12/2006 | Katou | ................. | B60C 23/0408 116/34 R |
| 2007/0062268 A1 * | 3/2007 | Blossfeld | ............ | B60C 23/0494 73/146.8 |
| 2008/0250852 A1 * | 10/2008 | Capdepon | ........... | B60C 23/0494 73/146.8 |
| 2008/0314488 A1 | 12/2008 | Achterholt | | |
| 2009/0007649 A1 * | 1/2009 | Kempf | ................ | B60C 23/0408 73/146.8 |
| 2012/0312389 A1 * | 12/2012 | Kempf | ................ | B60C 23/0494 137/227 |
| 2015/0328944 A1 | 11/2015 | Chen | | |
| 2018/0038500 A1 * | 2/2018 | Mori | ....................... | F16K 15/20 |

FOREIGN PATENT DOCUMENTS

| | | | | |
|---|---|---|---|---|
| JP | 2016055695 | A1 | 4/2016 | |
| JP | 2016175605 | A * | 10/2016 | ......... B60C 23/0494 |
| WO | 2007014589 | A1 | 2/2007 | |

OTHER PUBLICATIONS

English Translation of the Written Opinion for International Application No. PCT/FR2018/052564, dated Jan. 30, 2019, 5 pages.

\* cited by examiner

INFLATION VALVE FOR TIRE RIM WITH LIMITATION OF ELASTIC DEFORMATION

CROSS REFERENCE TO RELATED APPLICATIONS

This application is the U.S. National Phase Applications of PCT International Application No. PCT/FR2018/052564, filed Oct. 16, 2018, which claims priority to French Patent Application No. 1759644, filed Oct. 16, 2017, the contents of such applications being incorporated by reference herein.

FIELD OF THE INVENTION

The present invention relates to an inflation valve intended to be placed in a tire rim orifice of a motor vehicle, the valve being of the type with elastic deformation, this inflation valve having a means of limiting a deformation of an elastic portion of the valve, it being possible for such a deformation to lead to leaks of the valve during travel of the motor vehicle.

The present invention also relates to an assembly of a tire rim of a motor vehicle and of such an inflation valve.

BACKGROUND OF THE INVENTION

Such a valve has a tubular core adapted to form an internal air passage from an external longitudinal end of the valve to an internal longitudinal end, external and internal being considered relative to the interior and exterior of a rim through which such a valve passes. The tubular core is at least partially surrounded by a sleeve of elastically deformable material from a longitudinal central portion toward the internal longitudinal end of the valve. The sleeve has the shape of a bulb that widens in proximity to the internal longitudinal end of the valve and ends with an internal longitudinal bulb end. It is the deformation of the bulb at the rim orifice, mainly when the motor vehicle is traveling, that an aspect of the present invention intends to limit.

Such inflation valves with elastic deformation, also known as "snap in" valves, are widely used. Such valves may be combined with an electronic module for monitoring one or more operating parameters of the tire such as, for example, its pressure, its temperature and/or its rotation speed.

It is thus known that operating parameters of the wheels of a motor vehicle are measured by one or more sensors mounted in electronic modules, called electronic units for measuring operating parameters of a wheel tire or wheel units. These sensors may, for example and without restriction, be a pressure sensor in a tire mounted on a wheel and/or a radial acceleration sensor making it possible to determine the speed of rotation of the wheel.

In a known manner, wheel units generally include a microprocessor, a memory, a radiofrequency transmitter, a power-supply battery and at least one radial acceleration sensor capable of measuring the radial accelerations of the wheel, this radial acceleration sensor being mounted on a support forming a printed circuit board. The radial acceleration measurements are sent at radiofrequency by a radiofrequency wave transmission device, frequently combined with the acceleration sensor, to a central system for monitoring the operating parameters of each wheel, and in particular its rotation speed, called a central wheel control unit, the central monitoring system being inside the motor vehicle. This radiofrequency wave transmission device has antennas oriented precisely toward the central monitoring system so as to optimize transmissions. It follows that such valves comprise a module accommodating all the necessary electronics.

The inflation valve associated with this electronic module is conventionally of two types. Either it is a metal inflation valve screwed into an orifice of a rim of the vehicle, or it is a valve with elastic deformation which is forced into the orifice of the rim by deformation of the elastic material forming its body. An aspect of the present invention relates more particularly to a valve with elastic deformation.

The concept of a valve with elastic deformation used hitherto for a tire pressure sensor consists in fixing the module containing the electronics to a brass tubular core. This is a rigid connection made by screws or another system, for example, a metal clip.

The valve has two main functions: sealing during the life of the valve, and sealing of the electronic elements that the valve contains and ensuring one-step rim mounting. The two embodiments existing today are rigid fixing by screws, and the presence of a clearance between the valve and the module.

The second embodiment involves a telescopic connection without clearance between the valve and the module with a metal-clip fixing system. In the first embodiment of a fixing of the module to the valve by a screw, the main drawback is having to preserve an approximately 5-mm gap between the rear of the valve and the module in order, on the one hand, to absorb the movements of the rubber bulb when inserting the valve into the orifice of the rim and, on the other hand, not being able to mount the valve on an extended rim panel with a sheet thickness of 1 mm up to a 5-mm aluminum rim.

The necessary presence of this gap reduces the dynamic performance levels of the valve as a wheel unit during travel owing to the centrifugal force and provides a significant and undesirable catching point during tire-fitting operations. In unfavorable cases, the tire lip may catch the casing and damage it.

In both cases, during travel, the rubber bulb of the valve will stretch more and more until a leak or a tear in the rubber is created, thus limiting performance levels at high speed. A valve with elastic deformation then no longer even fulfills the required qualities specific to a valve, which are mainly to provide a seal between the air contained in the tire and the outside.

In addition, such elastically deformable valves have the particular feature of comprising a sealing groove in which an edge portion of an orifice provided on the rim will be inserted when the valve is placed on the rim of the vehicle. The part of the rim received in the sealing groove is more or less thick, depending on the vehicle models and the chosen rim size. In a known manner, the majority of current rims measure from 1.5 mm to 5 mm in thickness, the most common thickness, for reasons of material costs, being of the order of 2 mm. A thickness of less than 2 mm is detrimental to guaranteeing sealing of the valve.

SUMMARY OF THE INVENTION

The problem underlying an aspect of the present invention is, for a valve with elastic deformation having a bulb of deformable material inserted at least partially into a rim orifice of a motor-vehicle tire, that of limiting the elastic deformation of the bulb once it is positioned on the rim.

To that end, an aspect of the present invention relates to an inflation valve intended to be placed in an orifice of the rim of a tire of a motor vehicle, the valve being of the type with elastic deformation and having a tubular core adapted to form an internal air passage from an external longitudinal end of the valve to an internal longitudinal end, the tubular core being at least partially surrounded by a sleeve of elastically deformable material from a longitudinal central portion toward the internal longitudinal end of the valve, the sleeve having the shape of a bulb widening in proximity to the internal longitudinal end of the valve and ending with one internal longitudinal bulb end, this inflation valve being noteworthy in that a cup of rigid material comprises a first portion facing an internal longitudinal bulb end face and at least a second portion curved away from the internal longitudinal end of the valve, the cup serving as a means of limiting deformation of the bulb.

A first portion of the cup facing an internal longitudinal bulb end face means that the first portion may be arranged either at a distance outside the internal longitudinal bulb end face, or bearing at least partially against the end face or can be integrated into the end face, in particular by overmolding.

It is essentially the one or more second portions curved away from the internal longitudinal end of the valve that serve as a means of limiting deformation of the bulb that may occur during travel of the vehicle and not during assembly, in other words "deformation-blocking means", being intended to abut against the inner wall of the rim, advantageously in a preferred embodiment of the present invention against an edge region of the orifice of the rim. However, the presence of this or these curved second portions is recognizable on the inflation valve taken in isolation from the rim, being specific characteristics of this inflation valve.

The limiting means are active for a valve mounted on a rim mainly during travel of the vehicle during which the sleeve and its bulb are subjected to a centrifugal force deforming the bulb. The bulb will start to deform and the or at least one of the curved second portions will follow this deformation and come into contact with the rim, which limits the deformation of the bulb and increases the sealing performance levels at high speed and also the fatigue resistance of the valve during its lifetime.

In addition, this or these curved second portions will protect the bulb from shear damage by the edge of the rim orifice penetrating more deeply into the bulb on one side of the bulb when the valve is subjected to a centrifugal force. The problems of sealing and of damage to the valve are thus reduced and performance levels are increased.

Advantageously, the first portion facing an internal longitudinal bulb end face bears at least partially against this end face or is arranged at a distance from this end face with one or more housings extending in a length of the bulb and starting from the end face for an at least partial insertion of said at least one curved second portion in the one or more housing(s).

Important parameters of the cup in order to have an effective bulb-deformation-blocking effect are a first distance between a free end of the curved second portion(s) and the rim, identifiable on the bulb by a positioning of a rim-receiving groove, and a second distance between the end face of the bulb and the first portion of the cup.

The first distance makes it possible to optimize the distance between rim and cup, and therefore the smaller this first distance the more the limiting effect is maximized. The second distance makes it possible to limit the return effect of the valve after insertion. Indeed, the greater this second distance the less the valve will retreat, which will result in an increase in the first distance after the insertion of the valve. The greater the second distance the more the bulb will be able to retreat during the insertion of the valve into the orifice of the rim during an installation phase, thus facilitating insertion.

Advantageously, the bulb carries a sealing groove at least partially around the bulb on its outer contour and having internal and external edges respectively turned toward the internal and external longitudinal ends of the valve, the groove being adapted to receive an edge of the orifice of the rim within, a free end of said at least one curved second portion of the cup being at most at the level of the internal edge of the groove.

This groove allows the insertion of the edge of the orifice within and guarantees sealing between the interior and the exterior of the rim, the bulb being compressed and bearing against the edge of the orifice of the rim.

The free end of the curved second portion(s) of the cup serves as a front stop against the rim, the free end of the or at least one of the curved second portions abutting against the rim during a significant deformation of the bulb. The length of the or each curved second portion of the cup in the direction of the rim, that is to say pointing toward the external longitudinal end of the valve, is to be determined precisely, as mentioned previously, as first distance.

This length may be short enough for the end(s) of the curved second portions not to abut against the rim in a rest position of the valve when not traveling, therefore without exerting a centrifugal force and without deformation of the bulb owing to this centrifugal force. In addition, during mounting of the valve and, where appropriate, of the electronic module on the valve, the valve undergoes a withdrawal movement toward the outside of the rim: it follows that the length of the end(s) of the curved second portions has to be estimated as short enough not to come into contact with the rim during assembly.

Conversely, this length is long enough for the end or ends of the curved second portions to abut against the rim during a deformation of the bulb owing to the acceleration of the vehicle, for which a blocking of deformation is considered necessary, this deformation being quantified by experience.

Advantageously, the internal longitudinal bulb end is interposed between the groove and the internal longitudinal end of the valve, the first portion of the cup having a central bore for the passage of the tubular core toward the internal longitudinal end of the valve. This central bore is advantageous, in particular for a passage of a telescopic tubular core.

Advantageously, the central bore of the cup is extended by a collar framing the tubular core, one end of the collar furthest from the bulb forming the internal longitudinal end of the valve. The collar can guide and protect the tubular core.

Advantageously, the tubular core protrudes from the sleeve with an external longitudinal end of the tubular core forming the external longitudinal end of the valve, the tubular core being telescopic or not, an internal longitudinal end of the tubular core being at the level of the groove for a non-telescopic tubular core, the cup being carried with clearance by the internal longitudinal bulb end or, when the tubular core is telescopic, the longitudinal end of the tubular core moves between the level of the groove and a more internal position than the internal longitudinal bulb end, the cup bearing at least partially against the internal longitudinal bulb end.

In this latter case, the cup may be positioned with clearance relative to the internal longitudinal bulb end.

Advantageously, said at least one curved second portion of the cup is a curved tab and the first portion of the cup is in the form of a disk or of a star. The presence of one or more tabs allows a saving of material compared to a curved second portion of the cup extending all around the first portion. A star with free parts between the points also allows a deformation of the bulb between the points. What is important is that the cup, and in particular the curved second portion(s), is (are) thick enough to be rigid and to act as abutment means against the rim without deformation of the first portion.

Advantageously, the cup comprises at least two curved tabs and, when the first portion is in the form of a star, the star has as many points as there are tabs.

Advantageously, the cup is secured by welding or adhesive bonding to the bulb or the cup is at least partially overmolded in the bulb, said at least one curved-away second portion having means for strengthening adhesion with the bulb of the notch or lug type or another harpoon-like element.

Any means allowing better securing of the cup to the bulb may be used and it is advisable to avoid sliding of the cup relative to the bulb. One or more notches or one or more lugs present, in particular on the curved second portion(s), penetrate the deformable material of the bulb and anchor the cup on the bulb.

Advantageously, the valve incorporates an electronic unit for measuring at least one operating parameter of a tire.

An aspect of the invention also relates to an assembly of a rim of a motor-vehicle wheel and of an inflation valve, the inflation valve being fitted through an orifice of the rim presenting an outer part to the rim and an inner part to the rim, this assembly being noteworthy in that the valve is as described previously, the cup and a part of the bulb being inserted into an interior of the rim, said at least one second portion curved away from the internal longitudinal end of the valve limiting a deformation of the bulb with a free end of said at least one curved second portion abutting against an internal wall of the rim in the vicinity of an edge of the orifice.

The stop between the or at least one of the curved second portions is frontal when this stop is on a free end of at least one curved second portion when deformation of the bulb is such that blocking of the deformation is considered necessary and prevents deformation from continuing.

Advantageously, the rim has an internal protuberance on its internal wall and said at least one curved second portion is configured such that a zone of said at least one curved second portion other than its free end abuts against the internal protuberance for an additional limitation of the deformation of the bulb.

This represents a second stop zone that contributes to stopping progression of the deformation of the bulb in addition to the first stop zone, which is a frontal stop of the free end of at least one curved second portion in the vicinity of the orifice of the rim. The first and second stop zones are advantageously in different directions to control the deformation of the bulb in at least two directions.

BRIEF DESCRIPTION OF THE DRAWINGS

Other features, aspects and advantages of the present invention will become apparent on reading the following detailed description and on examining the appended drawings given by way of non-limiting examples, and in which.

DETAILED DESCRIPTION OF THE PREFERRED EMBODIMENTS

In the following text, internal and external are considered with reference to the motor-vehicle-tire rim, any element inside the rim and therefore inside the tire being qualified as internal and any element outside the rim and therefore outside the tire being qualified as an external element.

The term "valve" may equally well denote an inflation valve used only for inflating and sealing the tire carried by the rim or a valve fulfilling other functions also, by being a wheel unit as previously mentioned. Thus, the valve can incorporate an electronic unit for measuring at least one operating parameter of a tire, such as pressure, temperature, speed of rotation of the tire or other parameters.

Figure 1:
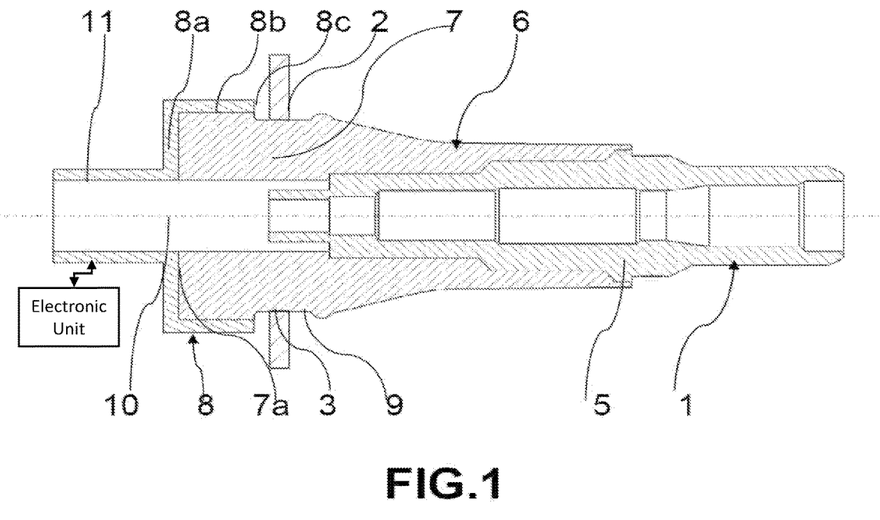
FIG. 1 is a schematic representation of a longitudinal sectional view of an inflation valve inserted into an orifice of a motor-vehicle tire rim in accordance with a first optional embodiment according to the present invention, the innermost face of the bulb carrying a cup limiting its deformation secured to said face, the cup being capable of abutting against a vicinity of the edge of the orifice of the rim, the tubular core being in the retracted position in this FIG. 1.
Figure 2:
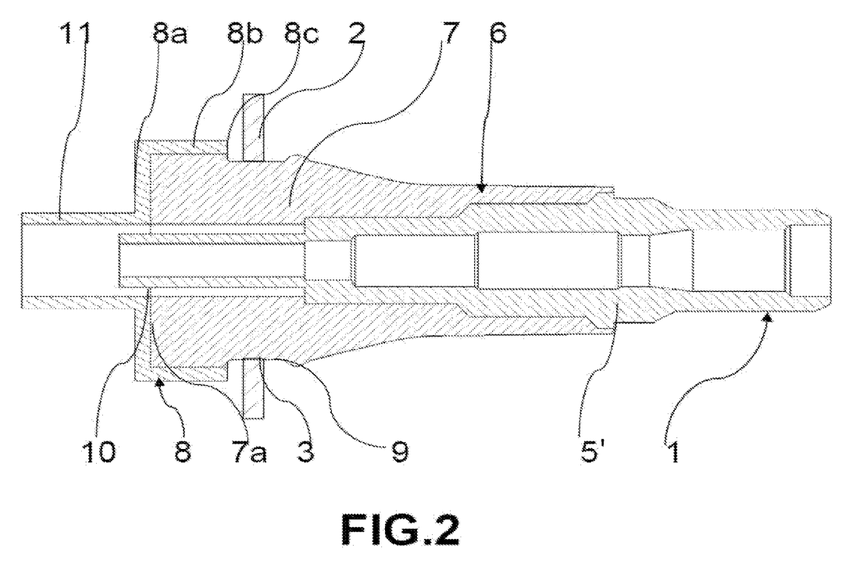
FIG. 2 is a schematic representation of a longitudinal sectional view of an inflation valve inserted into an orifice of a motor-vehicle tire rim according to a first optional embodiment according to the present invention, the innermost face of the bulb carrying a cup limiting its deformation secured to said face, the cup being capable of abutting against a vicinity of the edge of the orifice of the rim, the tubular core being stretched longitudinally in this FIG. 2.
Figure 3:
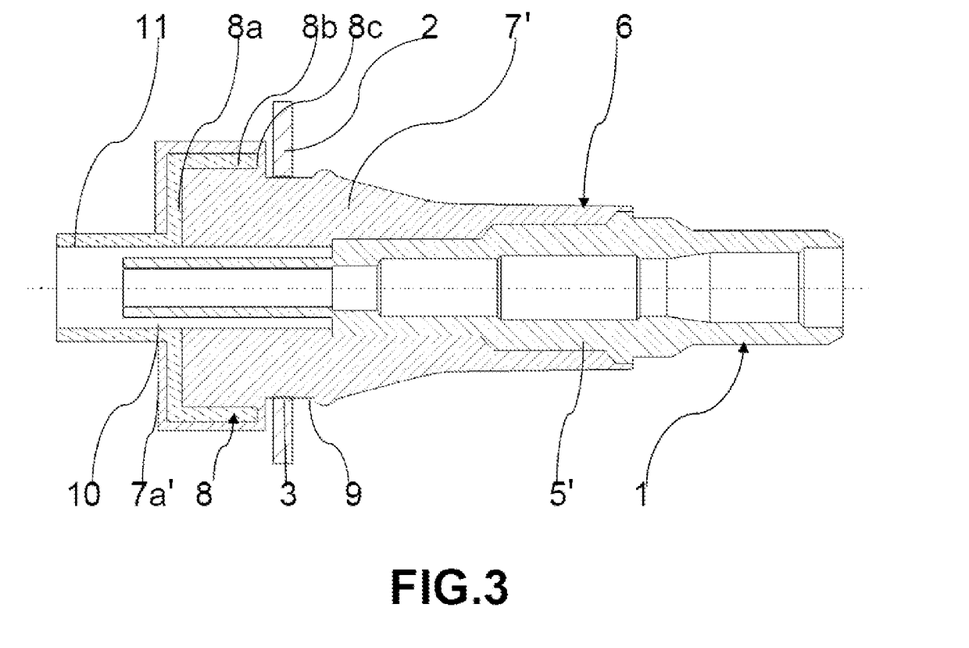
FIG. 3 is a schematic representation of a longitudinal sectional view of an inflation valve inserted into an orifice of a motor-vehicle tire rim according to a second optional embodiment according to the present invention, the innermost face of the bulb carrying a cup limiting its deformation overmolded in the bulb, the cup being able to abut against a vicinity of the edge of the orifice of the rim, the tubular core being stretched longitudinally in this FIG. 3.

Referring to all the figures and in particular to FIGS. 1 to 3, an aspect of the present invention relates to an inflation valve 1 intended to be placed in an orifice 3 of the tire rim 2 of a motor vehicle, the valve 1 being of the elastic deformation type. As previously mentioned, this valve 1 may be in the form of a wheel unit and not be reduced to serve for inflation and sealing of the tire on which the rim 2 is mounted, the valve 1 comprising an electronic module as electronic unit arranged inside the tire at an internal longitudinal end of the valve 1, this electronic unit shown in FIG. 1.

The valve 1 is of elongate shape and has a tubular core 5 adapted to form an internal passage of air from an external longitudinal end of the valve 1 to an internal longitudinal end. The external longitudinal end of the valve 1 may have a protective, sealing plug. The valve 1 may also have an electronic module as electronic unit at its internal longitudinal end.

For a valve 1 with elastic deformation, the tubular core 5 is at least partially surrounded by a sleeve 6 made of elastically deformable material. The tubular core 5 may be telescopic or non-telescopic relative to the cup. In FIGS. 1 to 3 and 6, the tubular core 5 is telescopic and in FIG. 4, the tubular core 5' is not telescopic.

The sleeve 6 of elastically deformable material surrounds the tubular core 5 from a longitudinal central portion toward the internal longitudinal end of the valve 1, although it may not reach this internal longitudinal end of the valve 1, in particular when the tubular core 5 is telescopic.

The sleeve 6 locally has a bulb shape 7 at its innermost longitudinal end, widening over its length in proximity to the internal longitudinal end of the valve 1. The bulb 7 terminates at an internal longitudinal bulb end, which may be its widest portion.

According to an aspect of the invention, the innermost longitudinal end of the bulb 7 has a cup 8 made of rigid material. The cup 8 may be metallic or made from hard plastics. There may be clearance between the cup 8 and the innermost longitudinal end of the bulb 7. This may be the case, in particular but not uniquely, for a non-telescopic tubular core 5.

The cup 8 has a first portion 8a facing an internal longitudinal bulb end face 7a. The first portion 8a may be carried, for example bearing at least partially on or at a distance from the internal longitudinal bulb end face 7a turned toward the internal longitudinal end of the valve 1, but also on the internal longitudinal bulb end face turned toward the internal longitudinal end of the valve 1, that is to say in an interior of the bulb 7', which is the case when the first portion 8a in particular and, if necessary, the entire cup 8 are overmolded in the bulb 7' of elastically deformable material.

The cup 8 comprises at least one second portion 8b curved away from the internal longitudinal end of the valve 1. The cup 8 serves as a means of limiting a deformation of the bulb 7, advantageously when the vehicle is traveling when the wheels turn and the valve 1 and in particular the deformable sleeve 6, and more particularly its bulb 7, are subjected to a centrifugal force.

The first portion 8a facing the internal longitudinal bulb end face 7a may be pressed at least partially against the bulb end face 7a or arranged at a distance from this end face 7a. In this case, for holding the cup 8', provision may be made for one or more housings 15, visible in FIG. 4, extending in a length of the bulb 7 and starting from the end face 7a for at least partial insertion of said at least one curved second portion 8b in the one or more housings 15.

As may be seen in FIGS. 1 to 3 and 6, the bulb 7 may have a sealing groove 9 at least partially around the bulb 7 on its outer contour and having internal and external edges respectively facing the internal and external longitudinal ends of the valve 1. The groove 9 may advantageously make a complete turn of the bulb 7, having as its center of rotation a point on the longitudinal median axis of the valve 1, this being in a radial plane relative to the valve 1. The groove 9 may have a U-shape section, the base of the U spacing the internal and external edges respectively forming a branch of the U.

Such a groove 9 may be adapted to receive an edge of the orifice 3 of the rim 2 within, advantageously an entire circumference of the edge of the orifice 3 of the rim 2. A free end 8c of the curved second portion(s) 8b of the cup 8 may be at most at the level of the internal edge of the groove 9.

Thus, if the bulb 7 deforms beyond a certain limit determined empirically during travel of the motor vehicle, a free end 8c pointing outward from the rim 2 of the or some of the curved second portions 8b may abut against a portion in the vicinity of the edge of the orifice 3 of the rim 2 when the motor vehicle is traveling through the action of the centrifugal force deforming the bulb 7 while the curved second portion(s) 8b, when the vehicle is stationary, did not previously interfere with the insertion of the valve 1 into the orifice 3 of the rim 2 during fitting of the valve 1.

The internal longitudinal bulb end face 7a may be interposed between the groove 9 and the internal longitudinal end of the valve 1, and therefore does not form the internal longitudinal end of this valve 1. In this configuration, the first portion 8a of the cup 8 may include a central bore 10 for the passage of the tubular core toward the internal longitudinal end of the valve 1.

The central bore 10 of the cup 8 may be extended by a collar 11 framing the tubular core 5, one end of the collar 11 furthest from the bulb 7 forming the internal longitudinal end of the valve 1. This is shown in FIGS. 1 to 3 and 6 while FIGS. 4 and 5 show a cup 8' without a collar 11.

As previously mentioned, the tubular core 5 is not necessarily surrounded by the sleeve 6 over its entire length. For example, the tubular core 5 may protrude from the sleeve 6 with an external longitudinal end of the tubular core 5 forming the external longitudinal end of the valve 1.

Figure 4:
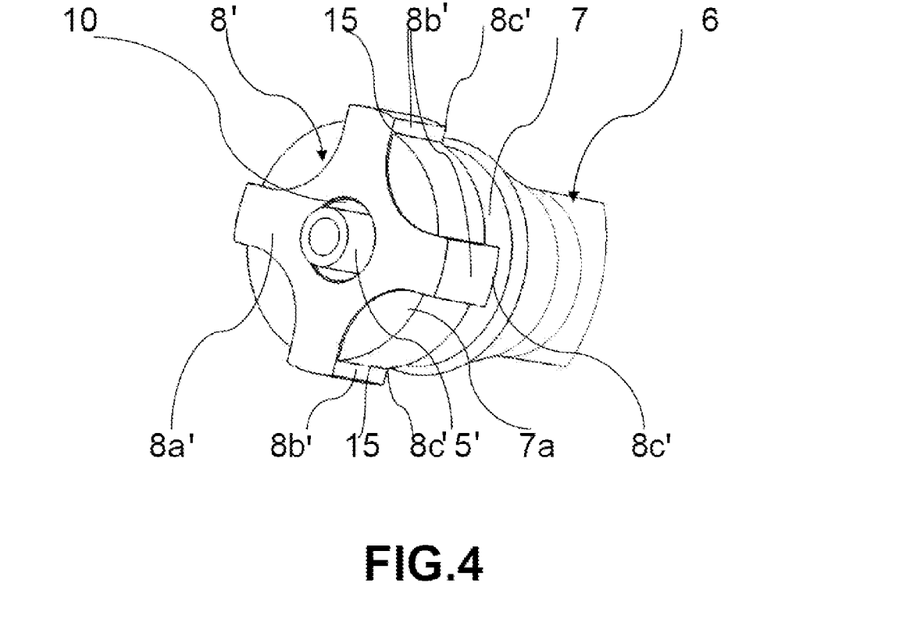
FIG. 4 is a schematic representation of a perspective view of the face most internal to the rim of the bulb, this face carrying a cup according to an embodiment of the present invention, the cup being in the form of a star having tabs limiting deformation of the bulb that the tabs enclose.
Figure 5:
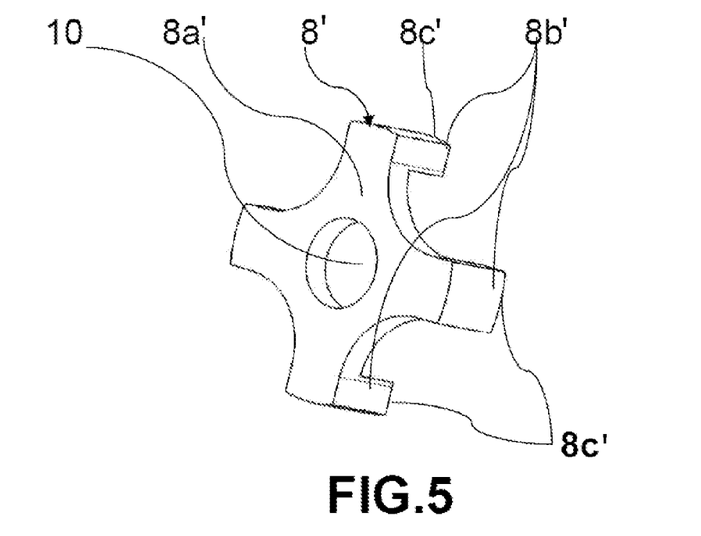
FIG. 5 is a schematic perspective representation of the cup shown in FIG. 4 taken in isolation from the bulb.

FIG. 4 shows a non-telescopic tubular core 5'. In this case, the cup 8' may be carried with clearance from the internal longitudinal bulb end face 7a.

When the tubular core 5 is telescopic, which is shown in FIGS. 1 to 3 and 6, the longitudinal end of the tubular core 5 moves between the level of the groove 9 and a more internal position than the internal longitudinal bulb end face 7a, the cup 8 bearing at least partially against the internal longitudinal bulb end face 7a. In FIG. 1, the tubular core 5 is in the retracted position and in FIGS. 2, 3 and 6 the tubular core 5 is in the deployed position.

Referring to all the figures and in particular to FIGS. 4 and 5, the curved second portion(s) of the cup 8' may be one or more curved tabs 8b and the first portion 8a of the cup 8' may be in the form of a disk or a star. This is a preferred but non-limiting embodiment of the present invention and, alternately, a single curved second portion may, for example, run entirely around the first portion 8a of the cup 8'.

FIG. 4 shows a cup 8' with a first portion 8a in the shape of a four-pointed star, this cup 8' being positioned on the internal longitudinal face of a bulb 7, each point of the star bearing, at its end, a tab 8b as the respective curved portion.

FIG. 5 shows a cup 8' with the same star shape for the first portion 8a as in FIG. 4 without this cup 8' being positioned in this FIG. 5 on the internal face of a bulb not visible in this figure. In both FIG. 4 and FIG. 5, the first portion 8a of the cup 8' is pierced with a central bore 10. These embodiments are not limiting.

Generally, a cup 8 comprises at least two curved tabs as curved second portions 8b. When the first portion 8a is in the form of a star, the star may have as many points as there are tabs 8b.

Figure 6:
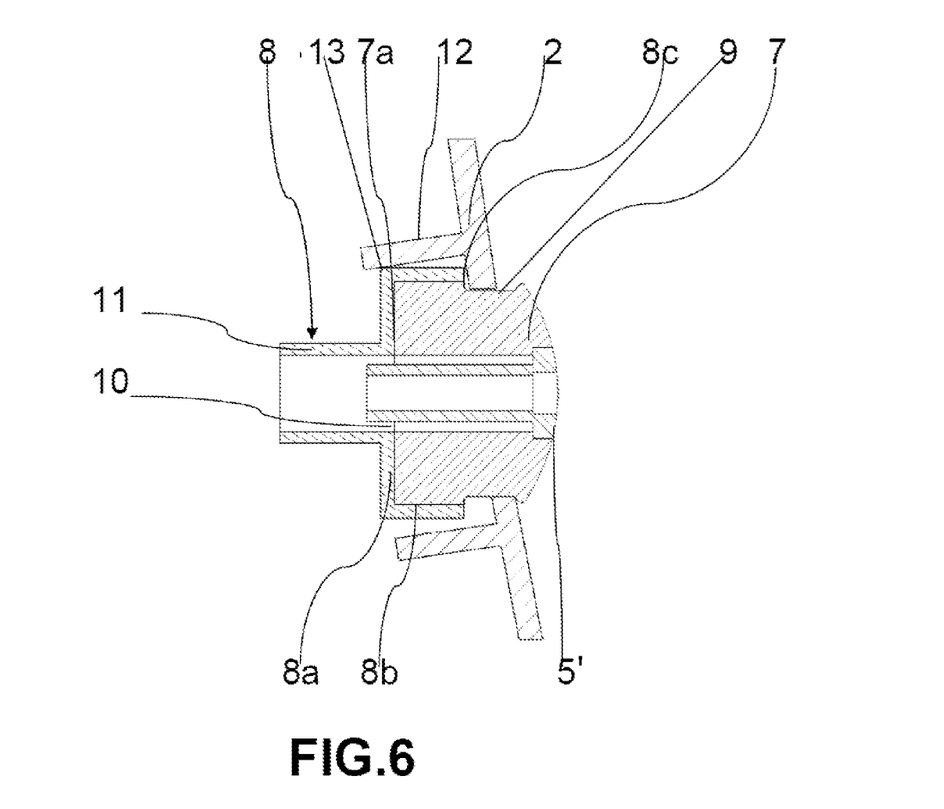
FIG. 6 is a schematic representation of a longitudinal sectional view of a rim portion enclosing, in an orifice, a bulb carrying a cup limiting the deformation of the bulb according to another optional embodiment according to the present invention, the rim having a internal protuberance and the cup abutting, in two different places, against the vicinity of the edge of the orifice of the rim and against the protuberance.

The cup 8, mainly its first portion 8a but also possibly its curved second portion(s) 8b, may be secured by welding or adhesive bonding to the bulb 7. This is shown in FIGS. 1, 2 and 6.

Alternately, as shown in FIG. 3, the cup 8, advantageously its first portion 8a but also its curved second portion(s) 8b, may be at least partially overmolded in the bulb 7'. When the cup 8 is overmolded, it is an overmolding layer that envelops the free end 8c of each curved second portion 8b serving as a stop, being interposed between the free end 8c and a stop zone on the rim 2, advantageously in the vicinity of the orifice 3 of the rim 2. Similarly, the cup 8 is no longer exactly located on the internal longitudinal bulb end face 7a', but is inserted into this face while being enveloped by an end layer of the bulb 7'.

In the two cases described above, and more particularly for a cup 8 secured by adhesive bonding or welding, the curved-away second portion(s) 8b may have means for strengthening adhesion with the bulb 7 of the notch or lug type or another harpoon-like element, for example a series of successive notches for anchoring the curved second portion(s) 8b with the bulb 7, these strengthening means not being shown in the figures. Housings 15 of the curved second portions 8b may also increase the securing of the curved second portions 8b with the bulb 7.

An aspect of the invention also relates to an assembly of a rim 2 of a motor-vehicle wheel and of an inflation valve 1, the inflation valve 1 being fitted through an orifice 3 of the rim 2 by presenting an outer part to the rim 2 and an inner part to the rim 2, the outer part projecting from the motor vehicle and the inner part being contained in the tire associated with the rim 2.

According to an aspect of the invention, for a valve 1 as previously described, the cup 8 and part of the bulb 7 are inserted inside the rim 2, the second portion(s) 8b of the cup 8 curved away from the internal longitudinal end of the valve 1 limiting a deformation of the bulb 7 with a free end 8c of the or at least one curved second portion 8b abutting against an internal wall in the vicinity of an edge of the orifice 3 of the rim 2. This stop is advantageously frontal.

For several curved second portions 8b symmetrically distributed around the first portion 8a of the cup 8, when a curved second portion 8b in abutment bears on the rim 2 during a deformation of the bulb 7, it is possible that at least one curved second portion 8b, lying substantially opposite the curved second portion 8b in abutment or the most angularly distant from this curved second portion 8b in abutment, for example at 180° or 120° of this curved second portion 8b in abutment, is not in contact with the rim 2 or is even withdrawn with respect to the rim 2. Thus, all the curved second portions 8b may not be simultaneously in abutment against the rim 2, which is frequently the case.

As may be seen in FIG. 6, the rim 2 may have an internal protuberance 12 on its internal wall in the vicinity of the orifice 3. This protuberance 12 has, in FIG. 6, the non-limiting form of a stud pointing toward the inside of the rim 2 while extending substantially perpendicularly relative to the internal wall of the rim 2. In this case, the curved second portion(s) 8b may be configured such that a zone 13 of said at least one curved second portion 8b other than its free end 8c comes into abutment with the internal protuberance 12 for an additional limitation of the deformation of the bulb 7.

In FIG. 6, the protuberance 12, advantageously in the form of a stud, may cover a curved second portion 8b and act as a second stop against one end of the curved second portion 8b connected to the first portion 8a, this connected end making a second stop zone 13 while the free end 8c of the curved second portion 8b forms the first stop zone. This second stop is a lateral stop against the stud 12 while the free end 8c of the curved second portion 8b is in abutment or in the process of being in frontal abutment with a zone in the vicinity of the edge of the orifice 3 of the rim 2 and not the edge itself since the edge is accommodated in the groove 9 carried by the bulb 7.

The invention claimed is:

1. An inflation valve intended to be placed in an orifice of a rim of a tire of a motor vehicle, the valve being elastically deformable and having a tubular core adapted to form an internal air passage from an external longitudinal end of the valve to an internal innermost longitudinal end of the valve, the tubular core being at least partially surrounded by a sleeve of elastically deformable material from a longitudinal central portion toward the internal innermost longitudinal end of the valve, the sleeve having the shape of a bulb widening in proximity to the internal innermost longitudinal end of the valve and ending with an internal innermost longitudinal bulb end, the valve comprising:
    a cup of rigid material comprising a first portion at a position longitudinally inward relative to an innermost longitudinal bulb end face and facing the internal innermost longitudinal bulb end face and at least one curved second portion extending longitudinally outwardly from the first portion beyond the internal innermost longitudinal end of the valve, the at least one curved second portion contacting the bulb, the cup serving as a means of limiting deformation of the bulb,
    the cup comprising a central bore extending from an outermost longitudinal end of the at least one curved second portion of the cup to the innermost longitudinal end of the valve, the central bore aligned with an axis of the tubular core and having a diameter sufficient to accommodate passage of the tubular core toward the internal innermost longitudinal end of the valve, wherein the central bore of the cup is extended by a collar framing the tubular core, one end of the collar furthest from the bulb forming the internal innermost longitudinal end of the valve,
    wherein the bulb carries a sealing groove at least partially around the bulb on an outer contour thereof and having internal and external edges respectively turned toward the internal and external longitudinal ends of the valve, the groove being adapted to receive an edge of the orifice of the rim within, a free end of said at least one curved second portion of the cup being at most at a level of an internal edge of the groove.

2. The valve as claimed in claim 1, wherein the first portion facing the internal innermost longitudinal bulb end face bears at least partially against the innermost longitudinal bulb end face turned toward the internal innermost longitudinal end of the valve or is arranged at a distance from the innermost longitudinal bulb end face with one or more housings extending in a length of the bulb and starting from the innermost longitudinal bulb end face for an at least partial insertion of said at least one curved second portion in the one or more housings.

3. The valve as claimed in claim 1, wherein the internal innermost longitudinal bulb end is interposed between the groove and the internal innermost longitudinal end of the valve.

4. The valve as claimed in claim 1, wherein said at least one curved second portion of the cup is a curved tab and the first portion of the cup is in the form of a disk or a star.

5. The valve as claimed in claim 4, wherein the cup comprises at least two curved tabs, and, when the first portion is in the form of a star, the star has as many points as there are tabs.

6. The valve as claimed in claim 1, wherein the cup is secured by welding or adhesive bonding with the bulb or the cup is at least partially overmolded in the bulb, said at least one curved second portion having means for strengthening adhesion with the bulb.

7. The valve as claimed in claim 1, wherein the valve incorporates an electronic unit for measuring at least one operating parameter of the tire.

8. An assembly of the rim of a motor-vehicle wheel and of the inflation valve, the inflation valve being fitted through the orifice of the rim presenting an outer part to the rim and an inner part to the rim, wherein the valve is as claimed in claim 1, the cup and a part of the bulb being inserted into an interior of the rim, said at least one curved second portion curved away from the internal innermost longitudinal end of the valve limiting a deformation of the bulb with a free end of said at least one curved second portion abutting against an internal wall of the rim in the vicinity of an edge of the orifice.

9. The assembly as claimed in claim 8, wherein the rim has an internal protuberance on an internal wall thereof and said at least one curved second portion is configured such that a zone of said at least one curved second portion other than a free end thereof abuts against the internal protuberance for an additional limitation of the deformation of the bulb.

\* \* \* \* \*